(12) United States Patent
Harrison et al.

(10) Patent No.: US 7,216,347 B1
(45) Date of Patent: May 8, 2007

(54) METHOD AND APPARATUS FOR PRIORITIZING PRINT JOBS FROM MULTIPLE PRINTER INPUT CHANNELS

(75) Inventors: Karen L. Harrison, Longmont, CO (US); Charles D. Johnson, Boulder, CO (US); Linda S. Liebelt, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,420

(22) Filed: Apr. 17, 2000

(51) Int. Cl.
  *G06F 9/46* (2006.01)
  *G06F 15/00* (2006.01)
(52) U.S. Cl. .................. 718/103; 718/100; 718/102; 358/1.15; 358/1.16
(58) Field of Classification Search ............. 709/100, 709/101; 718/100–108; 358/1.15–1.16; 400/582
  See application file for complete search history.

(56) References Cited

U.S. PATENT DOCUMENTS

| | | | |
|---|---|---|---|
| 5,327,526 A * | 7/1994 | Nomura et al. ............ 358/1.16 |
| 5,402,527 A | 3/1995 | Bigby et al. | |
| 5,513,126 A * | 4/1996 | Harkins et al. ............. 709/228 |
| 5,636,333 A * | 6/1997 | Davidson et al. .......... 358/1.15 |
| 5,701,411 A | 12/1997 | Tran et al. | |
| 5,791,790 A | 8/1998 | Bender et al. | |
| 5,873,659 A | 2/1999 | Edwards et al. | |
| 5,935,262 A | 8/1999 | Barrett et al. | |
| 5,970,223 A * | 10/1999 | Debes et al. ............... 358/1.16 |
| 5,970,224 A | 10/1999 | Salgado et al. | |
| 5,982,994 A | 11/1999 | Mori et al. | |
| 5,995,721 A | 11/1999 | Rourke et al. | |
| 6,025,925 A | 2/2000 | Davidson, Jr. et al. | |
| 6,046,817 A * | 4/2000 | Brown et al. ............. 358/1.16 |
| 6,333,789 B1* | 12/2001 | Shima ........................ 358/1.15 |
| 6,341,907 B1* | 1/2002 | Katsuyoshi ................. 400/582 |
| 6,370,521 B1* | 4/2002 | Pigos et al. .................... 707/2 |
| 6,552,813 B2* | 4/2003 | Yacoub ....................... 358/1.1 |

\* cited by examiner

*Primary Examiner*—Meng-Al T. An
*Assistant Examiner*—Jennifer N. To
(74) *Attorney, Agent, or Firm*—David W. Lynch; Chambliss, Bahner & Stophel

(57) ABSTRACT

A system, apparatus and method for dictating the order that print jobs received over multiple data channels are printed. A priority value is assigned to each data channel that receives print jobs. The priority value of the data channel is imparted to each of the print jobs received via its respective data channel. The relative priorities of the print jobs is determined, and the print jobs are printed in an order corresponding to their relative priority values.

33 Claims, 6 Drawing Sheets

METHOD AND APPARATUS FOR PRIORITIZING PRINT JOBS FROM MULTIPLE PRINTER INPUT CHANNELS

FIELD OF THE INVENTION

This invention relates in general to printing systems, and more particularly to a method and apparatus for prioritizing the order in which print jobs received over multiple data channels are printed.

BACKGROUND OF THE INVENTION

Desktop computers and computer networks are usually connected to various peripheral devices to extend the computer's capabilities. One common peripheral device is a printer, which produces text and images in hardcopy format. There are many different types of printers, broadly grouped into impact printers and non-impact printers. Printers may also be categorized by the environment under which they operate, such as local and network printers. A local printer is one that is directly connected to one of the ports on a desktop, workstation, or other single host computer, and a network printer is shared by multiple computers over a network.

Local printers receive print data from a source, such as a single host computer, and network printers receive print data via a network that contains at least one host computer or network server. In typical desktop personal computer (PC) environments, "print jobs" are submitted (via the direct connection or network) to the printer, as a means to pass the print data to the printer. Print jobs represent units of work to be run on a printer, and can include printing one or multiple files, depending on how the print jobs are requested. In single host environments, and particularly in network environments, a connected printer may be presented with a large print file or multiple print files by way of the print jobs. Generally, the printer is equipped with sufficient memory to accept large or multiple print jobs, thereby freeing the computer to continue normal operations by allowing the printer to retain the print jobs until they are physically printed. Alternatively, print spooling may be employed which includes a program or device that controls the flow of print data to the printer, and generally stores the programs in an organized manner on a hard disk until the printer becomes available.

Network printers may include multiple data channels, which are physical or logical attachments, through which print jobs can be received by the network printer. These data channels represent any printer input configuration, i.e., methods of printing, examples of which include LPD (a printing protocol of TCP/IP), IPP (internet print protocol), and the like. Each of the multiple data channels may present print jobs for printing, and more than one data channel may present a job at the same time.

While multiple data channels may be associated with a printer, the printer can only print one job at a time. Traditionally, where multiple print jobs from one data channel or multiple data channels are pending, the print jobs are printed in the order in which they are received. Therefore, where one data channel is associated with high priority print jobs, these high priority jobs might have to wait behind many lower priority jobs associated with other data channels. For example, in a particular computing environment, print jobs submitted over a TCP/IP LPR data channel may be considered higher priority than print jobs submitted over a different type of data channel. In such cases, it is undesirable and inefficient to force the higher priority print jobs to be held in abeyance while the lower priority print jobs consume valuable printer resources.

In view of the sophistication of modern day printers and the increasing use of multiple data channels associated with network printers, it would be desirable to avoid these and other problems associated with prior art systems for printing multiple print jobs. A need exists in the printing industry for a system and manner of governing the order that print jobs from multiple data channels will be printed. The present invention provides a solution to the aforementioned and other shortcomings of prior art printing systems, while offering additional advantages over the prior art.

SUMMARY OF THE INVENTION

To overcome limitations in the prior art described above, and to overcome other limitations that will become apparent upon reading and understanding the present specification, the present invention discloses a system, apparatus and method for prioritizing the order that print jobs received over multiple data channels are printed. Multiple data channels associated with the printer are each assigned a priority value, such as by a system administrator or other authorized user, and each print job received via a data channel adopts the priority value associated with the data channel from which the respective print job was received. In this manner, print job priority can be imparted to print jobs immediately upon their arrival to the printer.

In accordance with one embodiment of the invention, a method is provided for dictating the order that print jobs received over multiple data channels are printed. The method includes assigning a priority value to each data channel that receives print jobs. The priority value of the data channel is imparted to each of the print jobs received via its respective data channel. The print jobs are printed in an order corresponding to their associated priority values.

In accordance with another embodiment of the invention, a printing device is provided to receive and print jobs transmitted by computing devices. The printing device includes a plurality of data channels to receive the print jobs. Each of the data channels is assigned a priority value, and each of the print jobs received at the data channels assumes the priority value of its respective data channel. A compare module receives the priority values corresponding to each of the received print jobs, and identifies the print job exhibiting the highest priority. A print engine prints the print jobs in the order from the highest priority to the lowest priority. In accordance with another aspect of the invention, the printing device is used in connection with a network, where multiple computers are arranged in a network, and the computers transmit print jobs over the network. The printing device is also coupled to the network to receive and print the print jobs transmitted by the computers.

According to another embodiment of the invention, a computer-readable program storage medium that embodies a program of instructions executable by a print server system to process print jobs is provided. The program of instructions allows a priority value to be assigned to each data channel that receives print jobs. The program associates the priority value assigned to each data channel with each of the print jobs received at its respective data channel. The relative priorities of each of the print jobs is determined, based on its associated priority value. The program governs printing of the print jobs in a sequence corresponding to the relative priorities associated with each of the print jobs.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for dictating the order in which print jobs received over multiple data channels are printed. Multiple data channels associated with the printer are each assigned a priority value, and each print job received via a data channel adopts the priority value associated with the data channel from which the respective print job was received. In this manner, print job priority can be imparted to print jobs immediately upon their arrival to the printer.

Figure 1:
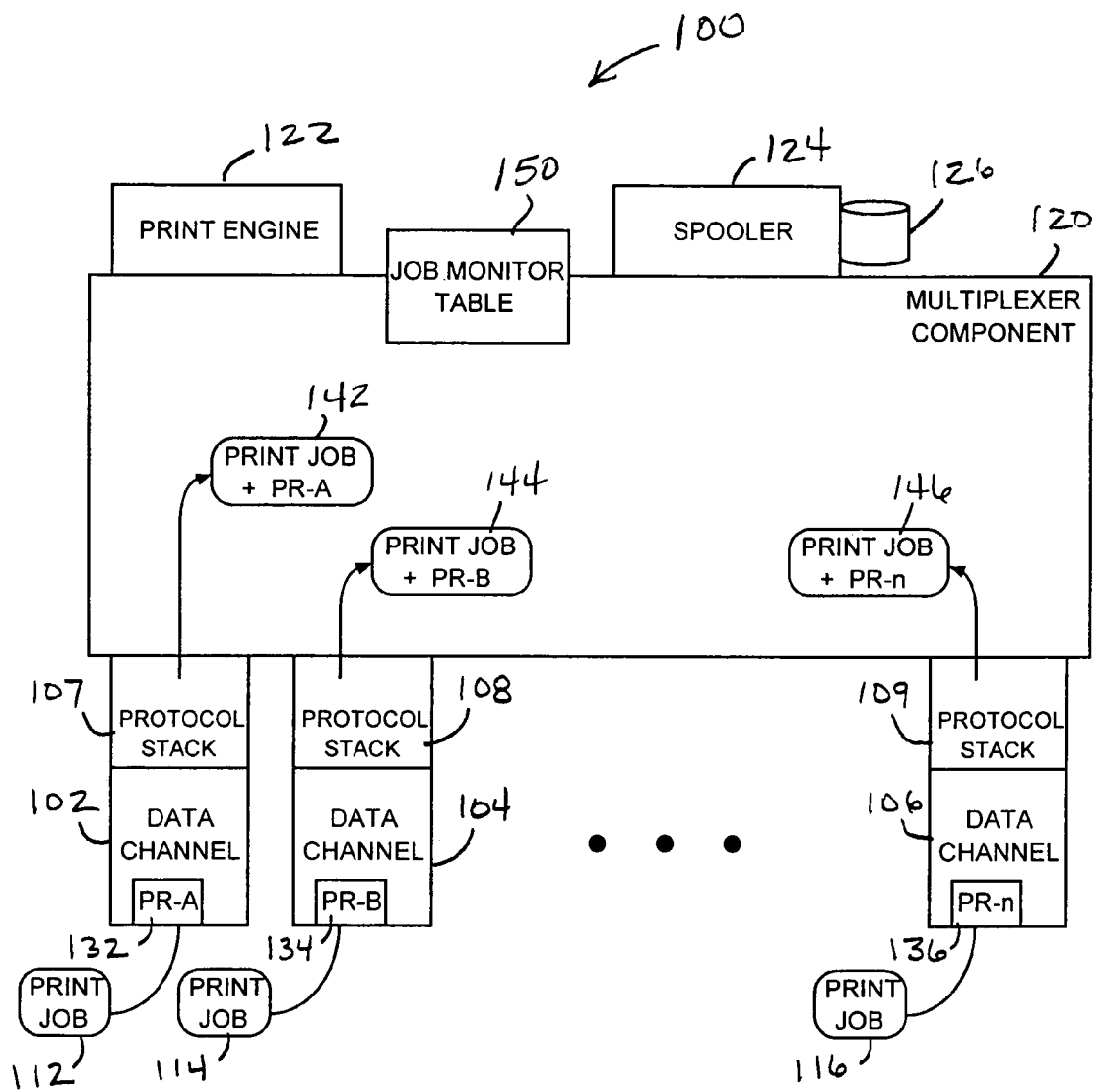
FIG. 1 is a block diagram illustrating a portion of a printing device incorporating the principals of the present invention.

FIG. 1 is a block diagram illustrating a portion of a printing device 100 incorporating the principals of the present invention. Print data is provided to the printing device 100 via a "print job," which is a unit of work to be run on a printer. A print job may include only one file, or multiple files, depending on how the print job is requested. The system assigns a unique job number to each print job it runs as a means to identify the print job.

The printing device 100 includes one or more physical or logical attachments over which print jobs are received. Examples of attachments include Ethernet, Twinax, Parallel ports, despooling components and others. Attachments represent a subset of a more abstract entity referred to as a "data channel," such as data channels 102, 104 and 106. Print jobs 112, 114 and 116 are provided to the multiplexer component 120 via data channels 102, 104 and 106 respectively, where the data channels represent any printer input configuration, i.e., methods of printing. The protocol stacks 107, 108, 109 represent the modules or operations for passing the print job from the physical layer to the appropriate protocol layer, depending on the particular physical layer and protocol employed (e.g., TCP/IP, parallel port, etc.). Any number of different data channels may be employed in connection with the present invention.

One task of the multiplexer component 120 is to manage logical connections between data channels and the multiplexer output paths. The multiplexer 120 may perform various functions for the disposition of a new print job. It may direct incoming print data to a multiplexer output path for the print engine 122 for immediate printing, or may direct the print data to a multiplexer output path for a spooling module 124. A storage medium, such as hard disk 126, may be provided to operate in connection with such a spooling module 124. A spool (Simultaneous Peripheral Operation On Line) module generally represents a program or device that controls the flow of data to an outputting device such as a print engine 122. Spooling allows a user to send a print job as a file to the hard disk 126, where it can be queued for printing by the print engine 122.

The multiplexer 120 may also signal the data channels to suspend the receipt of additional print data until that data can be processed. The connection between the data source (e.g., data channels) and the data sink (e.g., print output paths) is managed such that no more than one data channel has access to the print engine at a time. If the spooling feature is present, the multiplexer 120 manages the logical connection from the data channels 102, 104, 106 to the spooler 124.

The spooler 124 is the front end process to a despooling process that reads print data from the hard disk 126 and passes the print data through the multiplexer component 120 to the print engine 122. Upon initialization of the printer 100, the hard disk 126 is formatted with a "spooler" directory. In this manner, a certain amount of disk space is allocated for the spooler directory. Initialization is performed upon power up or "boot up" of the printer, or alternatively may be performed via express designation of an initialization command or other specific action.

One operation of the spooler process is to manage incoming print job requests. The spooler manages various operations, including the spooling of new print jobs. The spooler 124 also makes status changes to print jobs in a "job monitor table" 150. More particularly, the spooler component 124 effects function calls that the multiplexer component 120, and other entities of the controller, use to send new print jobs. These additions and other status updates to these print jobs are maintained in various status modules, including the job monitor table 150 and a job description file (JDF). The job monitor table 150 stores information relating to all of the spooled, currently spooling, and currently despooling print jobs for the spooler component 124. The information about each of these spooled, currently spooling and currently despooling print jobs is also stored in the JDF for persistence purposes over printer power cycles.

The JDF is a job description file that includes data relating to the specific print job. The job monitor table 150 includes fields corresponding to fields in the JDF, and the JDF is used to resurrect the job monitor table 150 in the event of a power cycle or other power loss to the printer. In this manner, jobs in the print queue will be preserved over power cycles of the printer. The despooler, upon initialization of the printer, reads each of the JDF files and informs a job monitor task to create an entry in the job monitor table 150 for these print jobs. When a new job is sent to the spooler, a new JDF will be created and written into the JDF directory. In one embodiment, the fields of the JDF and job monitor table are corresponding fields, and thus reference to the JDF and job monitor table may be used interchangeably for purposes of this description.

An example of the contents of such a JDF file is shown in Table 1 below:

TABLE 1

| | |
|---|---|
| jobid | The job ID of the spooled job |
| jobstatus | Denotes if the data file in the print directory was 0 (being written to disk), 1 (successfully written to disk), or 2 (unsuccessfully written to disk) |
| bytesspooled | Denotes the total number of bytes that have been spooled to the data file for this job in the print directory |
| commandflag | Denotes whether to 0 (print), 1 (hold), 2 (print and hold this job), or 3 (cancel) |
| copies | Denotes the number of copies the despooler PCM will produce to the multiplexer |
| format | Denotes whether to 0 (not format), 1 (format PDF to PS this file through the despooler PCM) |
| pcmid | Denotes the ID of the PCM that this job came in on |
| pcmpriority | Denotes priority of the PCM that this job came in on |
| pcmpersonality | The personality of the PCM that the job came in from |
| userhost | Denotes the user and/or host that sent this job to the printer |
| title | Denotes the title of this job to be printed |

Referring to Table 1, one of the fields stored in the job monitor table 150 and JDF is a "pcmpriority" field, which records the priority of the data channel that the particular print job was input to the printer 100. As will become more apparent below, this priority value reflects the priority assigned to the print job as a result of being input to the printer 100 via a particular one of the data channels 102, 104 through 106.

As can be seen in FIG. 1, the present invention allows priorities to be assigned to each user-accessible data channel, such as data channels 102, 104 through 106. These priority assignments to the data channels are represented by priority A (PR-A) 132, priority B (PR-B) 134, and priority n (PR-n) 136. When a priority has been assigned to a data channel in accordance with the present invention, print jobs associated with that data channel take on the corresponding assigned priority. For example, print job(s) 112 is received by the multiplexer component 120 via data channel 102 which, in the illustrated embodiment, is assigned a first priority PR-A 132. This results in the priority PR-A being associated with that particular print job, as represented by PRINT JOB+PR-A 142. Similarly, print job(s) 114 is received via data channel 104, resulting in the priority PR-B being associated with the print job (i.e., PRINT JOB+PR-B 144), and print job(s) 116 is received via data channel 106, resulting in the priority PR-n being associated with the print job (i.e., PRINT JOB+PR-n 146). Each data channel in the system thus assigns its respective priority value to the print jobs passing through that data channel. In one embodiment of the invention, the "pcmpriority" field of the job monitor table 150 and the JDF, as shown in Table 1 above, maintains the priority value corresponding to the data channel in which the particular print job was received.

Figure 2:
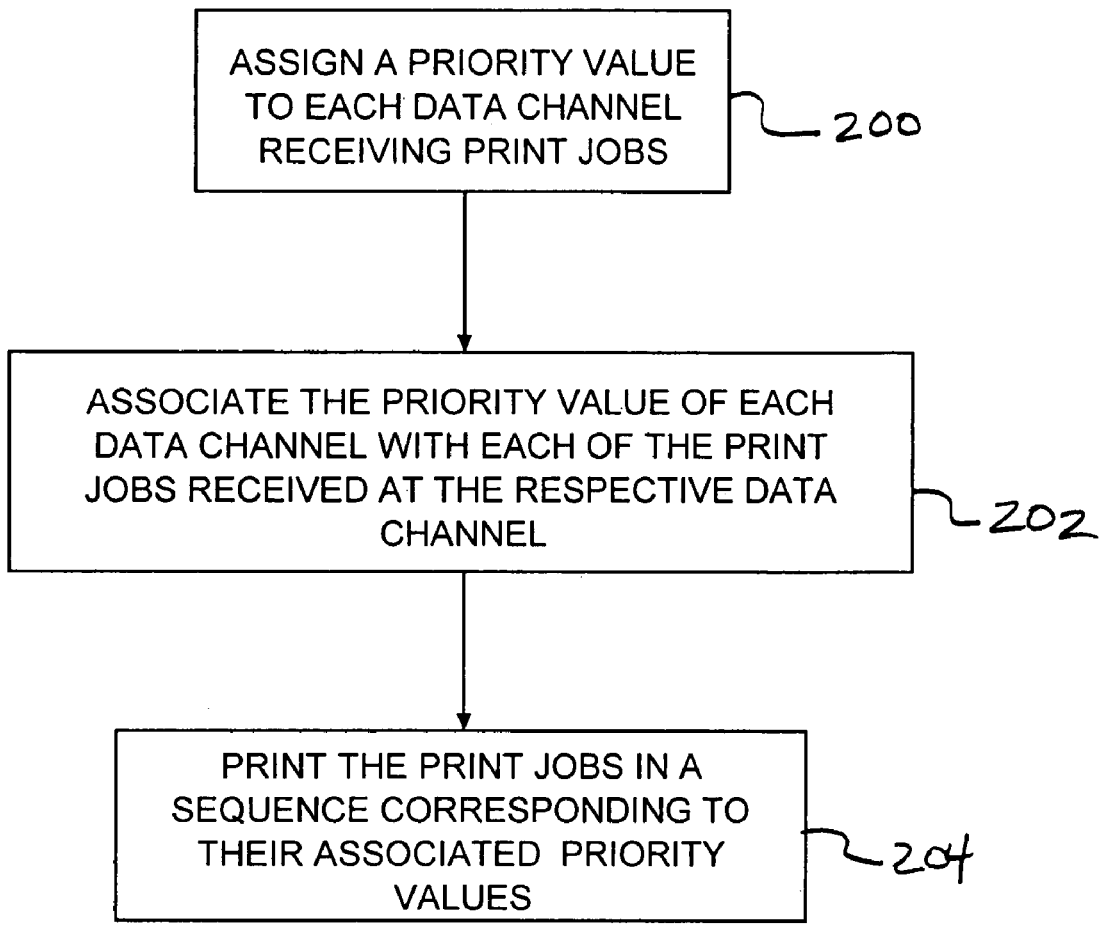
FIG. 2 is a flow diagram illustrating one embodiment for dictating the order in which print jobs are printed in accordance with the present invention.

Referring now to FIG. 2, a flow diagram is provided illustrating one embodiment for dictating the order in which print jobs are printed in accordance with the present invention. Each of the multiple data channels may present print jobs for printing, and more than one data channel may present a print job at the same time. However, the printer can only print one job at a time. The first data channel to present a print job to an idle printer is selected for printing. Data channels that present print jobs when the printer is busy must wait until the printer is free. The present invention provides the ability for the printer to apply prioritization to print jobs that are waiting for the printer.

A priority value is assigned to each data channel associated with the printer that receives print jobs, as illustrated at operation 200. In one embodiment, each data channel is assigned a different priority value. A different numeric priority is assigned to each user-accessible data channel, although alpha, alphanumeric, ASCII, or other indicia capable of order recognition can also be used instead of a numeric priority representation.

In this manner, jobs submitted over a particular data channel, such as a TCP/IP data channel, can be given priority over jobs arriving over another data channel. This also allows the printer to order the printing of internally-generated print jobs such that they are given a higher priority than any user-submitted print job, so that internally-generated print jobs are printed immediately when the printer is idle, or immediately following the current job when the printer is busy. Internally-generated job printing is described in greater detail below.

The priority value assigned to each data channel is then associated with each of the print jobs received via that data channel, as illustrated at operation 202. For example, all print jobs related to the TCP/IP data channel would receive the priority assigned to that data channel, such as a priority of 5 where the possible priority values range from 1–9. The print jobs are printed 204 in the order corresponding to these associated priority values. For example, where a print job relating to a data channel having a priority of 3 and a print job relating to a data channel having a priority of 5 are waiting for the printer, the print job relating to the data channel having a priority of 3 is printed prior to the print job that was received via the data channel having a priority of 5 (assuming the print priority increases as the priority value decreases). In this manner, printing is accomplished in an order that depends on which data channel the print jobs are received.

Figure 3:
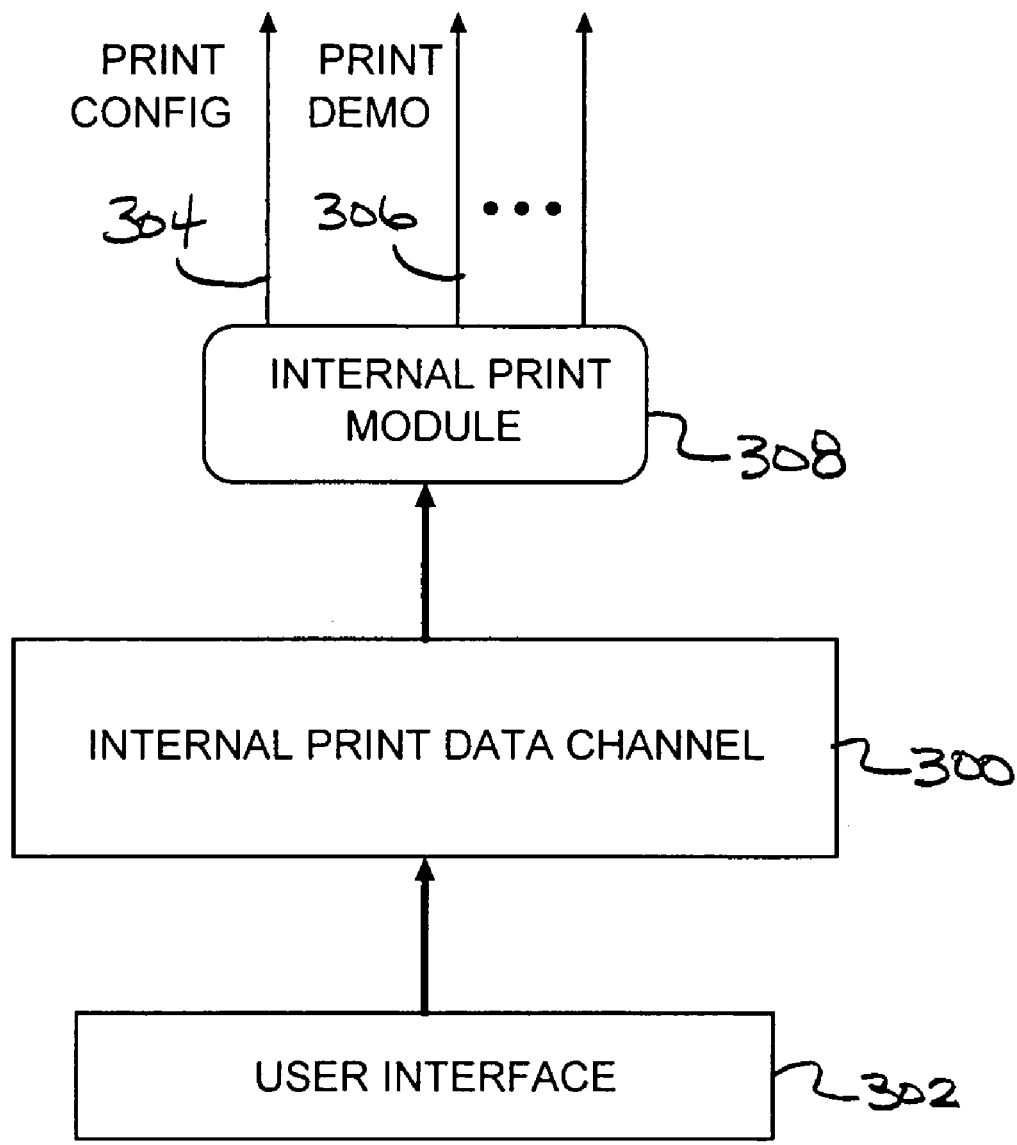
FIG. 3 is a block diagram illustrating an internal print data channel in accordance with one embodiment of the invention.

As previously described, a data channel in accordance with the present invention may include an internal print data channel 300 as illustrated in FIG. 3. The internal print data channel 300, like other print channels, provides a conduit to the multiplexer component, and ultimately to the print engine or spooler, for particular print jobs. The internal print data channel 300 facilitates printing of internally-generated print jobs, such as the printer configuration page 304, the printer demonstration (demo) page 306, and the like. An internal print module 308 recognizes the user input, and performs the appropriate function in response thereto.

Internally-generated print jobs are initiated by a user via a user request, which in one embodiment is initiated via a user interface 302. In one embodiment of the invention, the user interface 302 includes one or more manually-activated buttons resident on the printer device itself. Selection of a particular internally-generated print job, such as printing a printer configuration page or a print demo page, is thus initiated by pressing a button corresponding to the desired function. The user interface 302 may also include a graphical user interface (GUI) that displays a selectable list of available internally-generated print jobs on a display device, or alternatively may include other forms of user interfaces, including text entry, voice activated input, touch screens, etc.

In one embodiment of the present invention, the priority for the internal print data channel is set to zero (0), thus making it the highest priority data channel available in this embodiment. Another embodiment of the invention permanently sets the internal print data channel to a priority of zero, thus making this default setting unavailable to a printer administrator. In this case, the priority associated with the internal print data channel cannot subsequently be reset to a different priority value.

Figure 4:
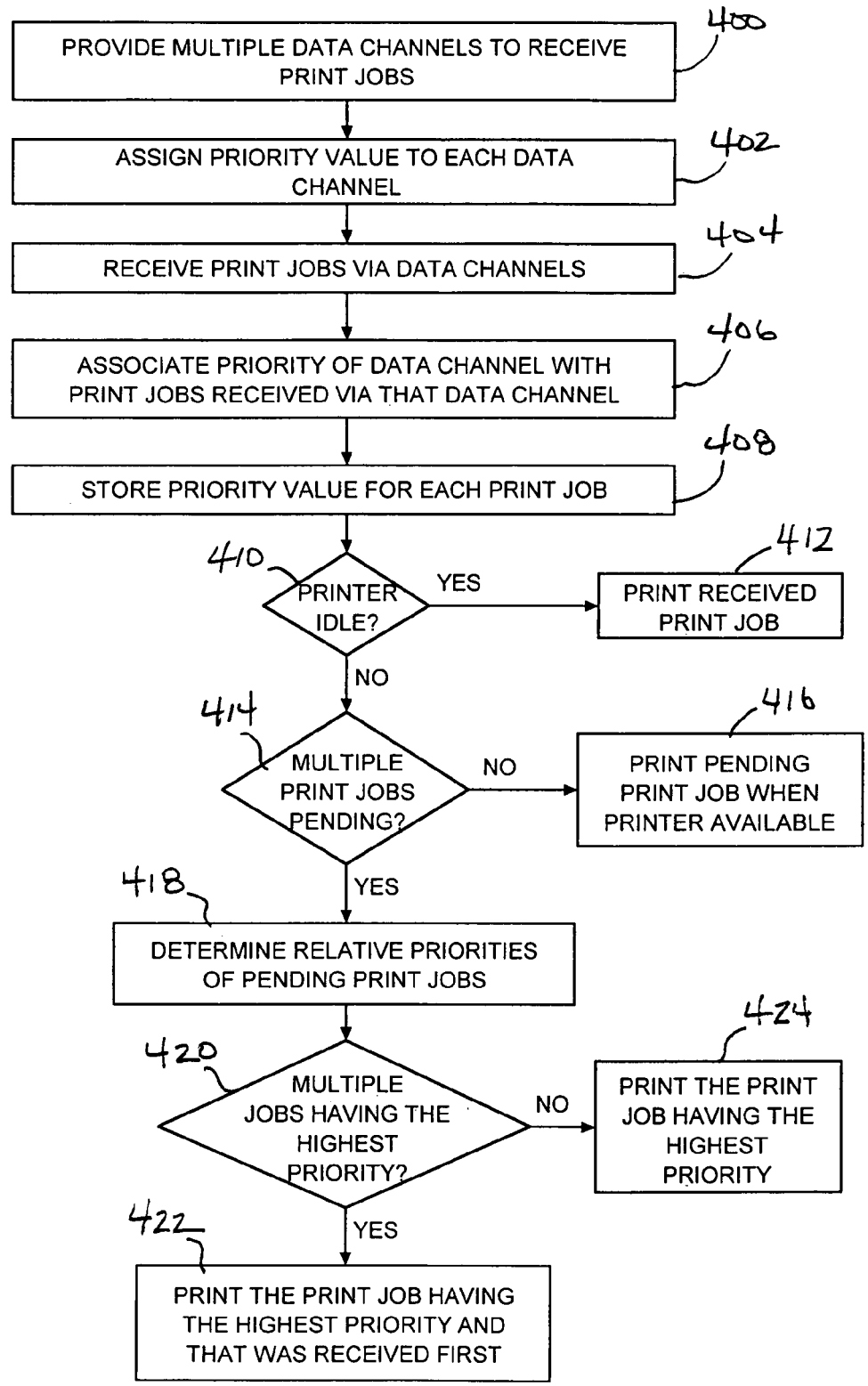
FIG. 4 is a flow diagram of a particular embodiment for dictating the order that print jobs are printed in accordance with the present invention.

Referring now to FIG. 4, a flow diagram is provided of another embodiment for dictating the order that print jobs are printed in accordance with the present invention. Multiple data channels are provided 400 for a printing device to receive print jobs. In one embodiment, each data channel is associated with a predefined group of print job types, such as those arriving via the parallel port, TCP/IP port, etc. In one embodiment, one data channel corresponds to internally-generated print jobs as described in connection with FIG. 3. A priority value is assigned 402 to each data channel. The priority value can be assigned upon initialization according to a predetermined priority schedule, or can be assigned/reassigned via a user interface by a printer administrator. In one embodiment of the invention, priority values 1–9 can be assigned to the data channels, where 1 is the highest priority and 9 is the lowest priority. In another embodiment, the data channel corresponding to the internally-generated print job is given the highest possible priority, such as priority value zero (0). In this manner, internally-generated print jobs will be printed before any other user-submitted print job. Each of the data channels may be assigned a different priority. Alternatively, one or more of the data channels may be assigned like priority values, in which case printing priority will be awarded to the like-priority print job that arrived first.

Print jobs are received via the data channels as illustrated at operation 404, and the priority of the data channel is associated 406 with each of the print jobs received via that data channel. The priority value for each print job may be stored 408. If the printer is idle as determined at decision operation 410, a print job received at any data channel can be immediately printed 412. If the printer is not idle, but only one print job is pending as determined at decision operation 414, the pending print job will be printed 416 when the printer becomes available (i.e., completes the print of the currently-printing job). If multiple print jobs are pending, the relative priorities of the multiple pending print jobs is determined, as illustrated at operation 418. Where more than one print job is determined to have the currently-highest priority as determined at decision operation 420, the one of these print jobs that arrived first will be printed first, as illustrated at operation 422. In this case, a time of arrival may be monitored, or alternatively the print jobs having a common priority value can be managed in a first-in-first-out queuing arrangement. Otherwise, where the highest current priority value applies to only one pending print job, that print job having the highest priority will be printed 424.

Figure 5:
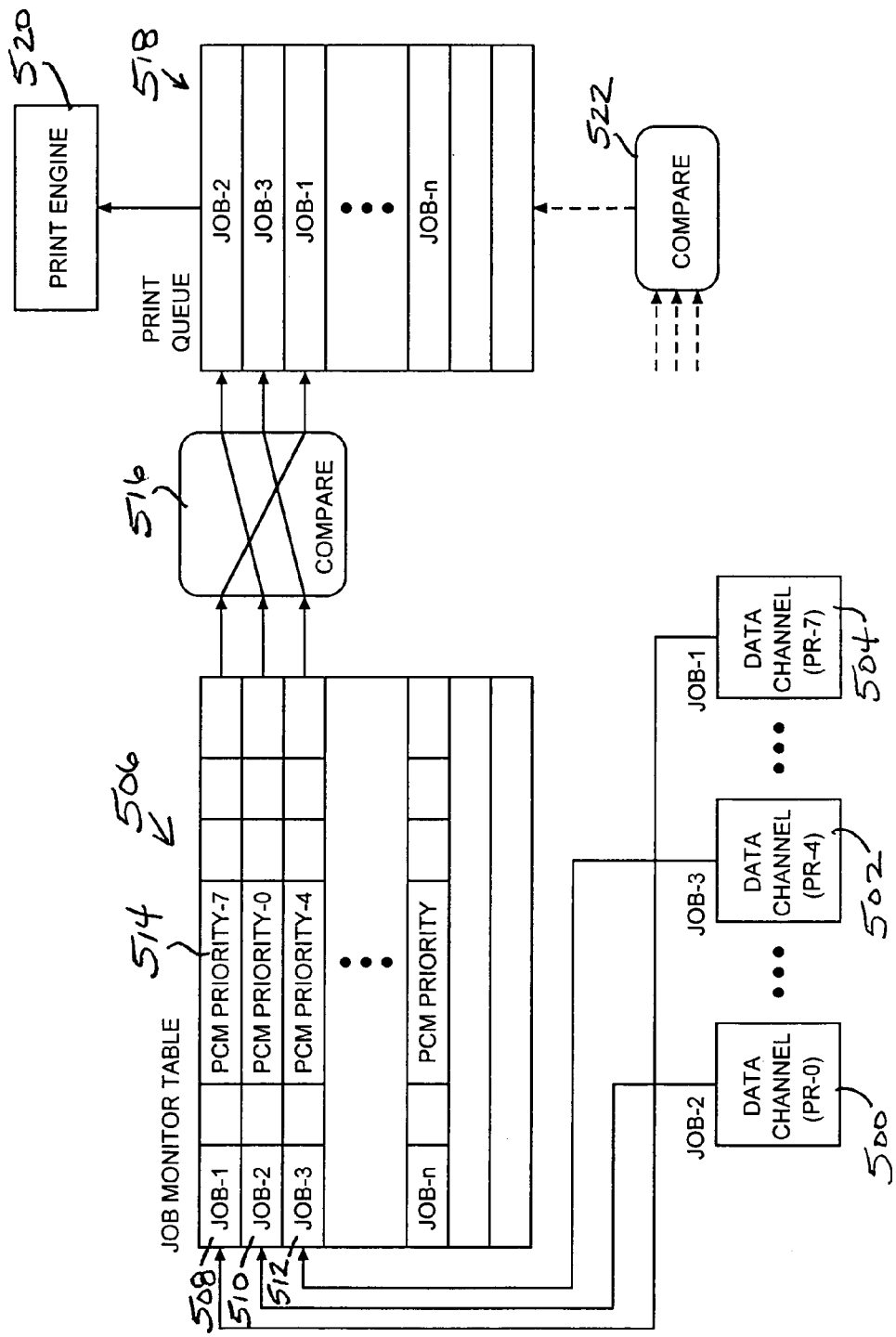
FIG. 5 is a block diagram illustrating an example in which the assignment of data channel priorities results in printing print jobs in an order dictated by the data channel priorities.

FIG. 5 is a block diagram illustrating one manner in which the assigning of data channel priorities results in printing print jobs in the order dictated by the data channel priorities. Three data channels are illustrated, including data channel 500 having been assigned a priority value of 0, data channel 502 having been assigned a priority value of 4, and data channel 504 having been assigned a priority value of 7. In this example, data channel 500 represents the internal print data channel, and has the highest priority possible.

Status information for the print jobs from each of the data channels is stored in the job monitor table 506. For example, status information for Job-1 from data channel 504 is stored at job monitor entry 508. Status for Job-2 is stored at job monitor entry 510, and status for Job-3 is stored at job monitor entry 512. As seen in FIG. 5, Job-1 at entry 508 is associated with PCM priority-7, Job-2 at entry 510 is associated with PCM priority-0, and Job-1 at entry 512 is associated with PCM priority-4. The PCM priority field 514 was described above in connection with Table 1 as the "pcmpriority," which records the priority of the data channel that the particular print job was input to the printer.

The data channel priorities in field 514 can be compared at compare module 516 to determine the appropriate priority of the print jobs. In the current example, priority-0 is higher than priority-4, and both are higher than priority-7. Therefore the priority of jobs in the print queue 518 is (1) Job-2; (2) Job-3; and (3) Job-1. The print jobs will be sent to the print engine 520 in the order of their relative priorities.

The compare module 522 represents another embodiment of the invention, where priorities for the print jobs are determined, and the print jobs are stored on the print queue 518. In such an embodiment, the PCM priority field 514 of the job monitor table 506 stores the priority to maintain the proper status of each print job. The compare module 522 can perform the print job priority comparison as the jobs are input via their respective data channels, and then appropriately queued by priority in the print queue 518. The job monitor table 506 in this embodiment stores the priority for each print job in the PCM priority field 514 as status information.

It should be recognized that the print queue 518 represents a logical entity, and print jobs may be ordered on the print queue 518 in the order in which they will ultimately be printed. Alternatively, print jobs may be placed on the print queue 518 in any order, but pulled off of the print queue 518 in an order corresponding to the assigned priority for the print jobs.

The invention allows a printer administrator to set the print job priorities to any value in a predefined range of possible priority values. This provides printer administrators additional control over the order in which print jobs are printed. The administrators granted such control can access operations that facilitate assignment of a priority to each data channel. Printer administrators are typically granted certain "rights" over other users, and in accordance with one embodiment of the present invention, only administrators are granted the right to assign or reassign priorities to data channels. Users having lesser privileges would then be unable to avail themselves to the data channel priority assignment operations that are available to the administrators.

Administrators or users having the proper rights can therefore access operational modules, such as computer programs, firmware, hardware or some combination thereof, to facilitate assignment of a priority to each data channel. The operational modules can be resident in the printing device or an external computing device coupled to the printing device. Administrators or other users may gain access to such operational modules upon proof of ownership of the requisite rights, such as entry of a system password to the administrator account or other permission requisite. This access may be provided via a user interface to the operational modules, where the administrator or user enters the desired data channel priorities therefrom. Generally, manners for allowing administrators to interface to privileged operational modules are known to those skilled in the art, and any such manner may be used without departing from the scope and spirit of the invention.

Hardware, firmware, software or a combination thereof may be used to perform the aforementioned operations. The functional modules used in connection with the invention may reside in a computing device, such as a print server, or the functional modules may perform these print server activities as resident modules on the printing device itself. An example computing structure that can be used in connection with firmware and other computer programs to carry out the present invention is illustrated in FIG. 6.

Figure 6:
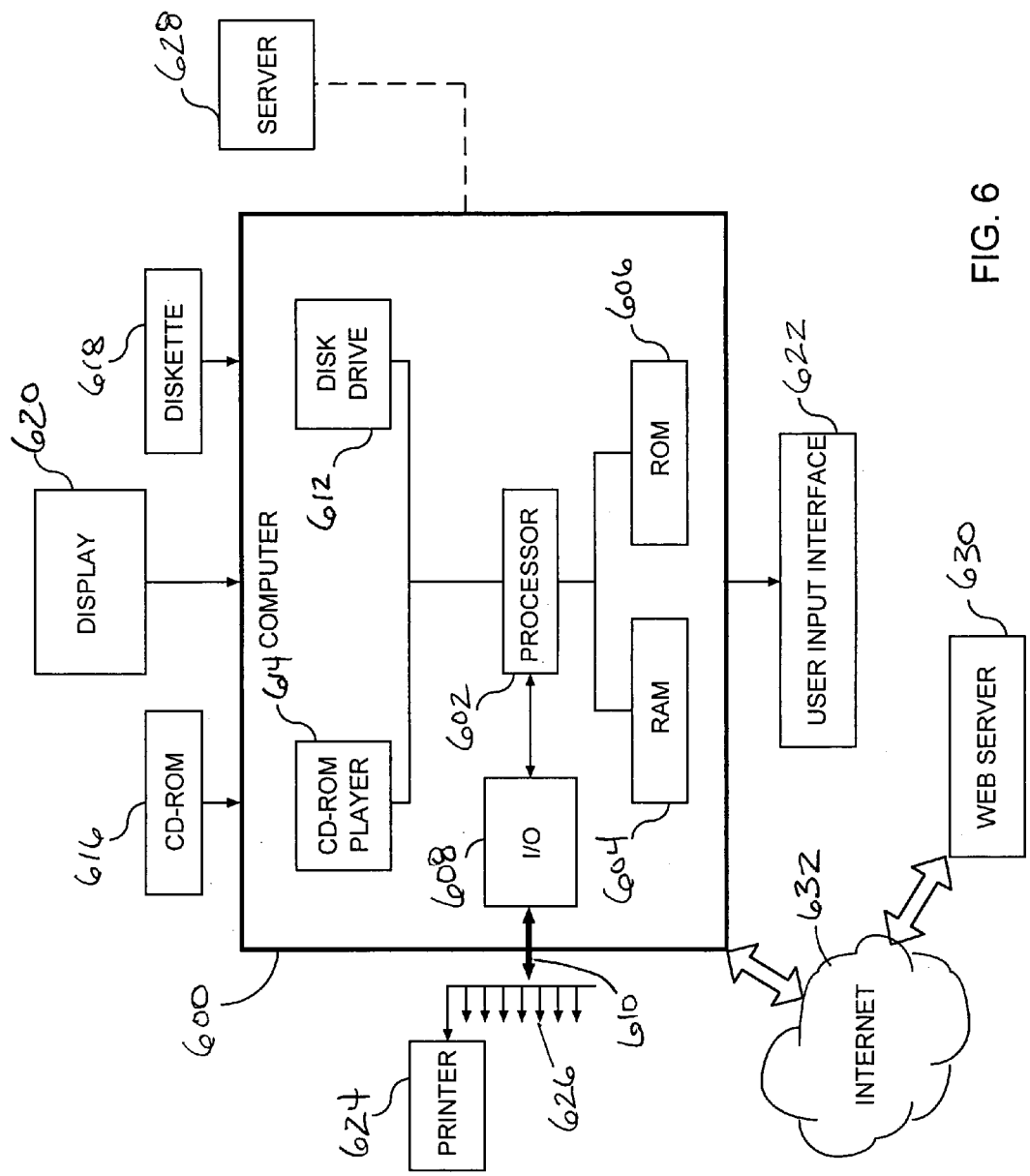
FIG. 6 is a block diagram of an example computing arrangement that can be used in connection with software, firmware and other computer programs to carry out the present invention.

Referring now to FIG. 6, a system block diagram of a example print server system 600 is shown, in which the principles of the present invention may be applied. A computing arrangement suitable for performing the print server functions in accordance with the present invention typically includes a central processor (CPU) 602 coupled to random access memory (RAM) 604 and read-only memory (ROM) 606. The processor 602 may communicate with other internal and external components through input/output (I/O) circuitry 608 and bussing 610. The computing arrangement 600 may also include one or more data storage devices, including hard and floppy disk drives 612, CD-ROM drives 614, and other hardware capable of reading and/or storing information. In one embodiment, software containing job control applications, such as line printer daemons for carrying out the present invention, may be stored and distributed on a CD-ROM 616, diskette 618 or other forms of media capable of portably storing information. These storage media may be inserted into, and read by, devices such as the CD-ROM drive 614, the disk drive 612, etc. The software may also be transmitted to the computing arrangement 600 via data signals, such as being downloaded electronically via a network such as the Internet. The computing arrangement 600 may also include a display 620, a user input interface 622 such as a mouse or keyboard, and one or more printers 624. As previously indicated, the computing arrangement 600 may be embedded within the printer 624 itself. External print jobs are generally provided to the computing arrangement/print server 600 via I/O ports 626. Print jobs originating from the print server 600 itself may also be provided to the printer(s) 624. The computing arrangement 600 may optionally be connected to other network servers 628 in an intranet or local network configuration. The computer may further be part of a larger network configuration as in a global area network (GAN) such as the Internet. In such a case, the computer accesses one or more web servers 630 via the Internet 632. Computing modules as described herein may reside on a print server connected to the printer(s), or alternatively may be embedded in whole or in part within the printer itself.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

Thus, in accordance with the present invention, a system and method is provided for allowing the printer to apply prioritization to print jobs received via multiple data channels. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for dictating the order that print jobs received over multiple data channels of a printer are printed, comprising:
    assigning priority values to data channels of a printer that receive print jobs;
    associating the priority value assigned to the data channel of the printer with the print jobs received by the printer at its respective data channel; and
    printing the print jobs by the printer in an order corresponding to their associated priority values;
    wherein assigning the priority value comprises assigning the priority value upon initialization of a printing device designated for printing the print jobs.

2. The method of claim 1, wherein assigning a priority value comprises assigning a different priority value to each data channel that receives the print jobs.

3. The method of claim 1, wherein assigning a priority value comprises assigning two or more of the data channels equal priority values, and wherein printing the print jobs comprises printing the print jobs received via the two or more data channels having equal priority values in an order in which they were received via the data channels.

4. The method of claim 1, wherein printing the print jobs in an order corresponding to their associated priority values comprises printing the print jobs in an order from highest priority to lowest priority.

5. The method of claim 1, wherein at least one of the data channels is dedicated as an internal print data channel to receive internally-generated print jobs.

6. The method of claim 5, wherein assigning the priority value to the data channel that receives print jobs comprises assigning the internal print data channel the highest possible priority.

7. The method of claim 1, wherein assigning the priority value to the data channel comprises assigning a priority value to each of the data channels that receives a different predefined group of print job types.

8. The method of claim 1, further comprising:
    determining whether a plurality of the print jobs currently pending have equivalent associated priority values; and
    printing the print jobs that have the equivalent associated priority values in an order in which they were received via their respective data channels.

9. The method of claim 8, further comprising determining the order in which the print jobs having equivalent associated priority values were received by monitoring time of arrival of the print jobs.

10. The method of claim 8, further comprising determining the order in which the print jobs having equivalent associated priority values were received by queuing the print jobs having equivalent associated priority values in a first-in-first-out arrangement.

11. The method of claim 1, further comprising queuing the print jobs in an increasing order according to their respective priority values, and forwarding the print jobs to a print engine for printing in the order in which the print jobs are queued.

12. The method of claim 1, further comprising queuing the print jobs in an order of receipt of the print jobs, and sending the print jobs to a print engine for printing in a sequential order corresponding to the respective priority values associated with the print jobs.

13. The method of claim 1, wherein assigning the priority value comprises assigning the priority value via a user interface by a user granted authority to reassign the priority values to selected ones of the data channels.

14. A printing device coupled to receive print jobs transmitted by one or more computing devices, the printing device comprising:
 a plurality of data channels at a printing device, the plurality of data channels being configured for receiving print jobs, wherein each of the data channels are assigned respective priority values, and wherein the print jobs received at the data channels assumes the priority value of its respective one of the data channels;
 a compare module coupled to receive the priority values corresponding the received print jobs and to identify the print job exhibiting the highest priority; and
 a print engine at a printing device, the print engine being configured for printing the print jobs in an order from the highest priority to the lowest priority as identified by the compare module;
 wherein the assignment of the priority value comprises assigning the priority value upon initialization of a printing device designated for printing the print jobs.

15. The printing device as in claim 14, further comprising one or more print queues coupled to receive and output the print jobs in an order received, wherein the print jobs are received in the order of the highest priority to the lowest priority.

16. The printing device as in claim 14, further comprising one or more print queues coupled to receive the print jobs in an order received, and to output the print jobs in an order corresponding to their respective priority values.

17. The printing device as in claim 14, further comprising a job monitor module coupled to the plurality of data channels to receive and store the priority values associated with the print jobs that are currently pending.

18. The printing device as in claim 17, wherein the compare module is coupled to the job monitor module to receive the stored priority values, and to identify the print job exhibiting the highest priority in response thereto.

19. The printing device as in claim 14, wherein the plurality of data channels comprise an internal print data channel in which internally-generated print jobs are received.

20. The printing device as in claim 19, wherein the internal print data channel is preassigned to the highest priority in a range of the priority values.

21. The printing device as in claim 20, further comprising a user interface coupled to the internal print data channel to allow a user to select print features to initiate the internally-generated print jobs.

22. The printing device as in claim 21, further comprising an internal print module to generate the internally-generated print jobs corresponding to the selected print features.

23. The printing device as in claim 14, wherein the priority of the print job is inversely proportional to the priority value associated with the print job.

24. A method of dictating the order in which print jobs are printed on a printing device, comprising:
 providing a plurality of data channels at a printing device to receive print jobs, wherein the data channels receive predefined groups of print job types;
 assigning a priority value to the data channels of the printing device that receive print jobs by assigning the priority value upon initialization of a printing device designated for printing the print jobs;
 associating the priority value of the data channels of the printing device with the print jobs received at the respective one of the data channels;
 determining relative priorities of the print jobs based on their associated priority values;
 printing the print jobs at the printing device in a sequence corresponding to the relative priorities associated with the print jobs.

25. The method of claim 24, wherein printing the print jobs in a sequence comprises printing the print jobs in a sequence of highest priority to lowest priority.

26. The method of claim 24, further comprising:
 designating one of the data channels as an internal print data channel 3 to receive internally-generated print jobs; and
 pre-assigning a priority value to the internal print data channel that represents the highest possible priority value of a priority value range of priority values.

27. The method of claim 24, wherein assigning the priority values to the data channels comprises assigning the priority values via a user interface to apply user-selected priorities to particular ones of the data channels.

28. The method of claim 24, wherein determining relative priorities of the print jobs comprises comparing the priority values of the print jobs that are currently pending to each other.

29. A computer-readable program storage medium tangibly embodying a program of instructions executable by a print server system to process print jobs by performing steps comprising:
 assigning priority values to a plurality of data channels of a printer that receive print jobs by assigning the priority value upon initialization of a printing device designated for printing the print jobs;
 associating the priority value assigned to each data channel of the printer with print jobs received by the printer at its respective data channel;
 determining relative priorities of a plurality of print jobs based on their associated priority values; and
 printing print jobs by the printer in a sequence corresponding to the relative priorities associated with the print jobs.

30. A printing device coupled to receive print jobs transmitted by one or more computing devices, the printing device comprising:
 a plurality of data channels at the printing device for receiving the print jobs;

means for assigning a priority value to the data channels of the printing device upon initialization of a printing device designated for printing the print jobs;

means for attributing the priority value of the data channels of the printing device to the print jobs received via its respective one of the data channels;

means for comparing the priority values of the print jobs that are pending, and for identifying the print job exhibiting the highest priority; and means for printing the print jobs by the printing device in an order from the highest priority to the lowest priority.

31. The printing device as in claim 30, further comprising means for queuing the print jobs in the order from the highest priority to the lowest priority.

32. A method for dictating the order that print jobs received over multiple data channels of a printer are printed, comprising:

assigning priority values to data channels of a printer that receive print jobs;

associating the priority value assigned to the data channel of the printer with the print jobs received by the printer at its respective data channel; and printing the print jobs by the printer in an order corresponding to their associated priority values;

wherein at least one of the data channels is dedicated as an internal print data channel to receive internally-generated print jobs and wherein assigning the priority value to the data channel that receives print jobs comprises assigning the internal print data channel the highest possible priority.

33. A method of dictating the order in which print jobs are printed on a printing device, comprising:

providing a plurality of data channels at a printing device to receive print jobs, wherein the data channels receive predefined groups of print job types;

dedicating at least one of the data channels as an internal print data channel to receive internally-generated print jobs;

assigning a priority value to the data channels of the printing device that receive print jobs;

assigning the internal print data channel the highest possible priority;

associating the priority value of the data channels of the printing device with the print jobs received at the respective one of the data channels;

determining relative priorities of the print jobs based on their associated priority values;

printing the print jobs at the printing device in a sequence corresponding to the relative priorities associated with the print jobs.

* * * * *